Figure 1:
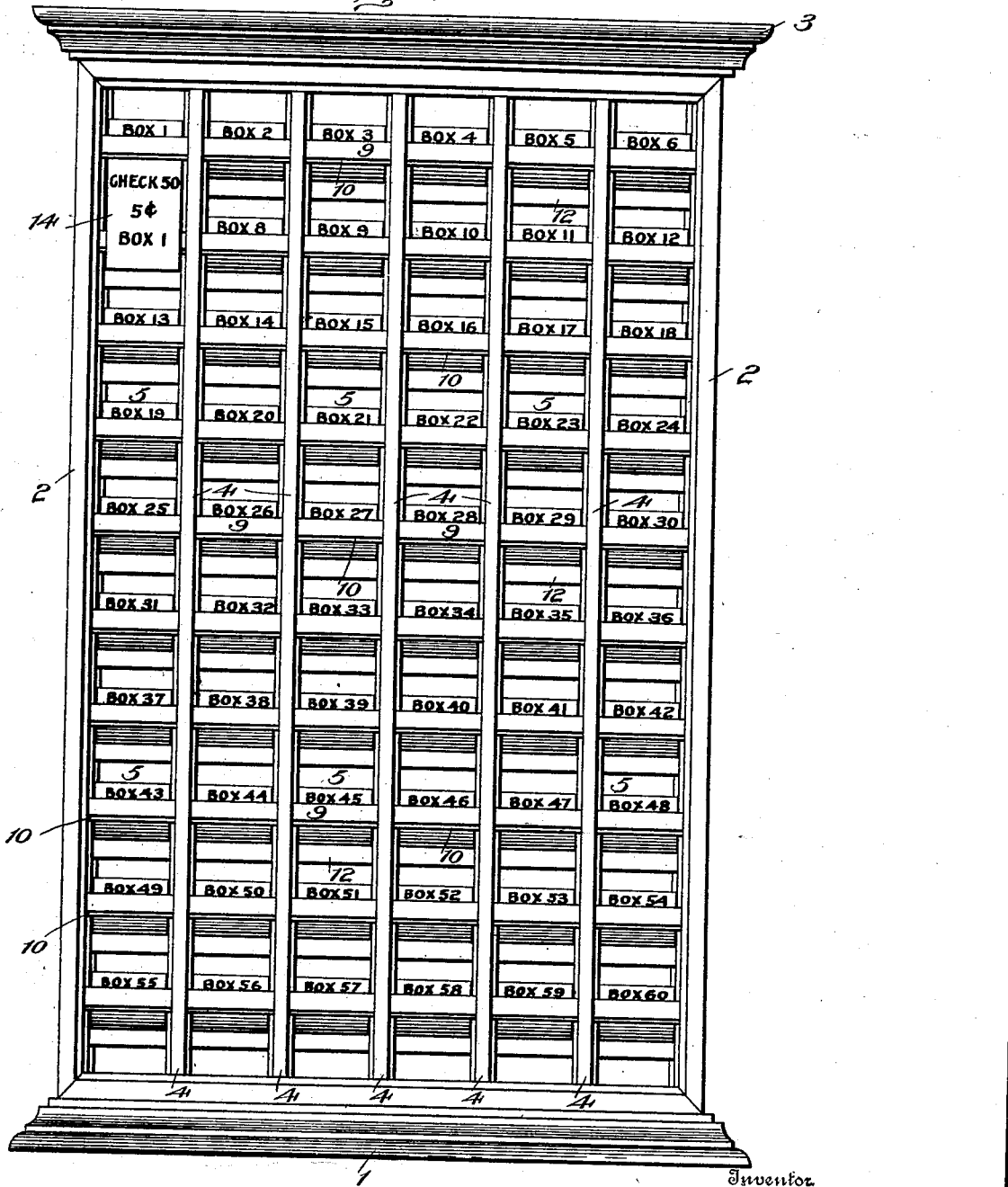

G. C. VOISARD.
SALES CHECKING AND RECORD CABINET.
APPLICATION FILED JAN. 7, 1907. RENEWED FEB. 13, 1908.

898,534.

Patented Sept. 15, 1908.

2 SHEETS—SHEET 1.

Witnesses
Edwin L. Bradford
Madge E. Wells

Inventor
George C. Voisard
By Johnson & Johnson
Attorneys

G. C. VOISARD.
SALES CHECKING AND RECORD CABINET.
APPLICATION FILED JAN. 7, 1907. RENEWED FEB. 13, 1908.

No. 898,534.

Patented Sept. 15, 1908.

2 SHEETS—SHEET 2.

Witnesses
Edwin L. Bradford
Madge B. Wells

Inventor
George C. Voisard
By Johnson & Johnson
Attorneys

UNITED STATES PATENT OFFICE.

GEORGE C. VOISARD, OF NEW YORK, N. Y., ASSIGNOR OF ONE-HALF TO WILLIAM J. BRYCE, OF NEW YORK, N. Y.

SALES CHECKING AND RECORD CABINET.

No. 898,534.    Specification of Letters Patent.    Patented Sept. 15, 1908.

Application filed January 7, 1907, Serial No. 351,145. Renewed February 13, 1908. Serial No. 415,766.

*To all whom it may concern:*

Be it known that I, GEORGE C. VOISARD, a subject of the King of England, residing at New York city, in the county of New York and State of New York, have invented certain new and useful Improvements in Sales Checking and Record Cabinets; and I do hereby declare the following to be a full, clear, and exact description of the invention such as will enable others skilled in the art to which it appertains to make and use the same.

My invention is directed to the production of a cigar sales checking cabinet for containing rolls of checks mounted in parallel rows presenting a vertical front with the rolls of each row in horizontal and vertical alinement and numbered say from one to fifty, the checks of each row unwinding from the front and each check severed from the roll constitutes a sales check of a cigar from a box which will be designated by the severed check, affording thereby a system of checks by which the number of cigars which may have been taken from each one of the boxes and the price of each cigar may be ascertained at once at any time by an inspection of the checks remaining on the rolls and in the claim, appended hereto I will set out the parts and combination of parts which constitute my invention.

The cabinet is designed for use by retail dealers of cigars and cigarettes, as a check against the misappropriation of any cigars or cigarettes which may have been given in charge of the salesman by a proprietor or other head of a retail shop. The checks of each roll are numbered to correspond with a box so that the check at any time of the sales appearing at the front of the roll will represent the precise number of cigars that should remain in the box and each check severed from each roll will give the cost of the cigar sold from each correspondingly numbered box, so that at any given time the cabinet will show the amount of stock on hand without referring to the stock which should consist of boxes bearing the same numbers as each roll of checks and for this purpose it will be understood that the number of the rolls of checks which the cabinet contains, as illustrated in the accompanying drawings, in which Figure 1 is a front elevation of the complete cabinet, will represent a like number of boxes from which the sales are to be made. Fig. 2 is a vertical cross-section taken through one of the rows of the rolls of checks in the cabinet. Fig. 3 is a horizontal section showing all the vertical rows of the cabinet. Fig. 4 is a rear view of one of the horizontal rows of the rolls of checks, showing the spring follower for each roll. Fig. 5 shows a part of a cigar box, which may contain fifty cigars, with the number say "5¢", marked thereon, corresponding to a similar number on each check of the check roll for that particular box and indicating the price of a cigar. Fig. 6 shows a piece of one of the sales checks showing the beginning and the ending check numbers and the coupon at the beginning. Fig. 7 shows one of the rolls of the sales checks in section.

The illustration of the cabinet shows a case whose vertical front presents a rectangular frame consisting of a base 1, from the ends of which rise sides 2, 2, connected by a top or cap 3, the space between the sides being divided, in the example shown, by five vertical parallel partitions 4, 4, the spaces between which are open at the front and at the rear and having a depth from front to rear greater than the diameter of the check-rolls. Each vertical space is divided so as to form a pocket space 5, for each roll of checks, in the example shown, being ten rolls and each roll is mounted within its containing pocket on a spool 6, which is preferably mounted to turn freely upon an axis pin 7, see Fig. 2, seated freely on offsets on the side walls of said pocket. I prefer to seat and confine the axis pin of each check containing spool within a recess 8, formed in each side wall of the pocket so that the recesses shall be open at the front, the back wall or offset of each recess extending from the bearing of the pin obliquely frontward and upward to permit the convenient insertion and seating of the pin with the roll of checks into its pocket, to allow it to be readily lifted therefrom and to allow it to be freely pressed toward the front. A plate 9, is fixed between the partitions in front of each pocket forming a retainer for the roll of checks within said pocket, and a cutter, on the lower horizontal edge 10, of which, the drawn checks are severed from the roll, and also forming a brake against which the roll is pressed and prevented from rotating while a drawn check is being severed from the roll. This brake function of the front retainer plate is caused in the example shown by a pressure tongue or follower 11, fixed between the partitions at the rear of the pocket and adapted to exert a constant pressure on the roll of checks forcing such roll against said retainer plate, the follower being adapted to maintain such pressure as the diameter of the roll diminishes. I have described the construction and mounting of one of the rolls of checks and the way in which each check is severed from the roll and it will be understood that each pocket formed between the several vertical partitions is provided with a roll of checks constructed, mounted and the checks severed therefrom in an identical manner. For cheapness and convenience of construction I prefer to have each roll retainer and cutter a separate plate and the follower for each roll made of a steel plate 12, fastened to the frame sides and the partitions and to make each follower a spring tongue standing mediately of the roll with the free end of each tongue bearing against the rear side of each roll pressing it against its front retaining cutter plate, so that each roll of checks will be used under identical conditions and retained in its pocket until all the checks of each roll are severed. A back 13, covers and incloses the rear side of the casing.

In Fig. 1 I have shown the outer end of each check strip beneath its retainer plate and exposing the number of the box from which the sales are to be made for that particular check-roll; while in Fig. 2 I have shown the outer end of one of the check-strips 14, as having been drawn outward beneath the edge 10, of the roll retainer in the position in severing the check from the roll. The first number appearing on the check-strips is the number of the box and it is intended for guidance in selecting a roll of the proper denomination from an unassorted number of rolls. The proprietor in selecting this roll delivers it to his employee with the box of cigars and takes the receipt or coupon which is detached from the roll, from his employee for this box. The employee then tears off the next piece of the roll which bears the number of the box and is pasted on it so that there must be a check roll for each box.

It is therefore apparent that as the employee has given his coupon receipt 15, for the cigars or stock he must necessarily return in the checks severed from the rolls together with the cash which they represent and that the rolls at all times must show the number of cigars of their particular kind left in each box. From this it will be seen that cigars cannot be exchanged from one box to another, as each roll is a particular check against each particular box and must necessarily correspond,—that is, the number on the check must correspond to the number on the box for the same price of cigars.

A more full explanation of the identification of the checks and the cigars in the sales system of protection which the cabinet is designed to afford to the employer and the employee, and the manner of using the cabinet as the means of keeping an account of all sales made and of all receipts therefrom, will be easily understood from the following: Each roll, consists of a strip of paper having printed thereon a series of checks numbered consecutively from 1 to 50, or otherwise according to the number of cigars in the box for which it is intended to use that roll as a check, each check in the series having also printed thereon the retail price of the cigar and a number corresponding to the number which is placed on the number of cigars. The strip of checks is then wound up on the spool so that check numbered 1 is the inmost or ending check and the highest numbered check is the first appearing in unrolling from the spool. The strip of checks also has at its outer or beginning end, when rolled, a receipt or coupon check 15 containing the number of the roll, which corresponds to a number placed on the box of cigars intended to be checked thereby, and also containing space for the salesman to insert the number of cigars, say fifty, in the box delivered to him by the proprietor, the date, the retail price of the cigars, and the gross price at retail of the total number of cigars in the box. The proprietor delivers the box and the roll correspondingly numbered to the salesman who signs the receipt check and severs and delivers the same to the proprietor. The clerk or salesman then places the roll in one of the pockets in the cabinet hereinbefore described, and for convenience and expedition in finding the particular check desired when a sale is made the roll numbers aforesaid may be arranged in regular order when the rolls are placed in the pockets, for instance, 1 to 60 being a simple illustration of a system of identifying the boxes.

While I have stated that any suitable number of check-rolls may be used it will be noted that the capacity of the cabinet comprises sixty rolls each representing a box of cigars of different prices or brands. I have also stated that the check-rolls are fitted in their pockets so as to be lifted out for renewing the spools with check-strips and for this purpose the pocket forming recesses are formed to allow the insertion of the replenished check-rolls and to permit the axis bearings of the spools to be pressed toward the front as the diameter of the roll is diminished by the severance of checks therefrom.

It is important to note that each pocket for the check-roll and its pin, is formed by a space between the partitions by the front retainer plate 9, by the spring follower 11, and by the offsets formed by the recesses 8, in the side walls of the partitions, so that the check-roll is freely supported by its axis pin on said offsets at the bottoms of said recesses and by the front retainer plate and by the rear spring follower whereby the check-roll may be easily inserted in the pocket over and between the retainer and the follower.

The pocket being open at the front affords facility for inserting and seating the check-roll, and being open at the bottom affords facility for ejecting the check-roll, and being open at the back affords facility for the engagement of the follower with the roll to press it against the front retainer; while the upward and frontward standing offsets of the wall recesses serve to receive the ends of the axis pins and guide them down into their seats in inserting the check-roll into its supporting pocket and in this the guiding function of the oblique offsets renders it easy to push the check-roll into its seat between the retainer plate and the follower. I make the axis pin separate from the spool so that the check-strip being exhausted, another check-roll can be placed on the pin and seated in the pocket.

In Fig. 1 at the top row I have shown one of the rolls from the check-strip of which the coupon receipt has been detached and which bears the numbers of the box and the price of a cigar exposed. Preferably the coupon is severed from the roll-strip before it is placed in the cabinet so that the next appearing number on the strip will be that of the box of cigars. While I have shown the numbers running consecutively commencing at the top at the left and ending at the bottom at the right, obviously any suitable system of numbering may be adopted for indicating the boxes and the prices, but the numbering of the checks should be as described to indicate the number of cigars in the box.

I claim:

1. A sales checking and record cabinet comprising a frame having a vertical front divided by vertical parallel partitions the spaces between which are open at the front, a spool having a check-strip rolled thereon horizontally mounted in alinement in each space, a plate fixed transversely between said partitions in front of said check-roll and forming a retainer therefor and for restraining the unwinding of said check-strip and forming a cutter therefor, and a spring pressed follower mounted on the rear side of the casing for forcing and maintaining the roll against its retainer.

2. A sales checking and record cabinet, comprising a frame having a vertical front divided by vertically spaced partitions the spaces between which are open at the front, a plurality of spools mounted in horizontal rows spaced between said partitions, a check-strip wound upon each spool, a plate fixed transversely between said partitions in front of said check-roll and constituting a retainer for said check-roll and a cutter for severing said strip, and a follower adapted to constantly exert a frontward pressure bearing the check-roll against its retainer.

3. In a sales checking and record cabinet a frame having a vertical front divided by vertically spaced parallel partitions the spaces between which are open at the front and each partition having on its opposite walls a recess open at the front, said recesses formed in horizontal alinement and spaced apart vertically, a plurality of spools mounted in bearings in the partitions formed by said wall recesses, a check-strip wound upon each spool, a retainer-plate fixed transversely between the partitions in front of each check-roll, and means supported on the rear side of the frame adapted to exert a constant pressure upon each check-roll whereby to maintain it under a yielding pressure against the retainer-plate.

4. A sales checking and record cabinet comprising a frame having a front divided into spaces by parallel partitions, check-roll receiving and seating pockets formed in said spaces by a fixed front retaining plate and by a spring pressed follower in engagement with the rear side of the check-roll, the said pockets each being open at the front, at the top, at the bottom, the inner walls of the said partitions having each a recess forming offsets by which the roll-pin is guided to its seat between the retainer plate and the follower, and supported upon said offsets in inserting the roll in its pocket.

In testimony whereof I have signed my name to this specification in the presence of two subscribing witnesses.

GEORGE C. VOISARD.

Witnesses:
MAURICE BLOCK,
EDWARD A. JARVIS.